United States Patent
Duan et al.

(10) Patent No.: US 9,956,887 B2
(45) Date of Patent: May 1, 2018

(54) BATTER CAPACITY DEGRADATION INDICATION

(71) Applicant: Ford Global Technologies, LLC, Dearborn, MI (US)

(72) Inventors: Xiaohong Nina Duan, Canton, MI (US); Dawn Bernardi, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 14/305,242

(22) Filed: Jun. 16, 2014

(65) Prior Publication Data

US 2015/0360578 A1    Dec. 17, 2015

(51) Int. Cl.
*B60Q 1/00* (2006.01)
*B60L 11/18* (2006.01)
*B60W 50/14* (2012.01)

(52) U.S. Cl.
CPC .......... *B60L 11/1861* (2013.01); *B60W 50/14* (2013.01); *B60W 2050/143* (2013.01); *B60W 2710/244* (2013.01); *B60Y 2400/214* (2013.01); *Y02T 10/6269* (2013.01)

(58) Field of Classification Search
CPC ... B60L 11/1861; B60L 11/186; B60W 50/14; B60W 2050/143; B60W 2710/244
USPC ........ 340/455, 636.1, 636.16–636.19, 636.2, 340/425.5, 438, 588; 320/134
See application file for complete search history.

(56) References Cited

U.S. PATENT DOCUMENTS

| | | | |
|---|---|---|---|
| 4,949,046 A | | 8/1990 | Seyfang |
| 5,140,269 A | | 8/1992 | Champlin |
| D378,500 S | * | 3/1997 | Nakai .......................... D10/103 |
| 5,757,595 A | * | 5/1998 | Ozawa ................ B60L 11/1818 320/104 |
| 6,794,853 B2 | * | 9/2004 | Kondo .................. H02J 7/0047 320/132 |
| 7,928,735 B2 | | 4/2011 | Huang et al. |
| 8,054,039 B2 | | 11/2011 | Bauerle et al. |
| 8,255,176 B2 | | 8/2012 | Plestid |
| 8,359,174 B2 | | 1/2013 | Nakashima et al. |
| 2003/0094321 A1 | | 5/2003 | Hirata et al. |
| 2009/0001935 A1 | * | 1/2009 | Odaohhara ............. H02J 7/045 320/134 |
| 2009/0040033 A1 | * | 2/2009 | Uchida .................. B60K 6/365 340/439 |

(Continued)

*Primary Examiner* — Toan N Pham
(74) *Attorney, Agent, or Firm* — David B. Kelley; Brooks Kushman P.C.

(57) ABSTRACT

Methods and systems are described to provide the user with information relating to status of vehicle and battery status based on environment and vehicle use. The user can be educated on the effects of vehicle use and environmental factors on the vehicle battery's status and ability to store charge. This is intended to alter the user's behavior to improve battery performance. A display can provide data representing at least one display image presenting information related to battery status, including capacity decay. A display generator can generate visual data for display in the at least one display image to provide visual stimulation, representing the battery state, which is based on the state of charge (SOC), temperature, and vehicle off time, and user selected options to reduce possible battery capacity decay, to the user.

18 Claims, 12 Drawing Sheets

(56) References Cited

U.S. PATENT DOCUMENTS

| | | |
|---|---|---|
| 2009/0109046 A1 | 4/2009 | Gielniak |
| 2009/0319179 A1* | 12/2009 | Mino ................ G01C 21/26 |
| | | 701/408 |
| 2010/0036626 A1* | 2/2010 | Kang ............... G01R 31/3679 |
| | | 702/63 |
| 2011/0140660 A1 | 6/2011 | Potter |
| 2011/0163722 A1 | 7/2011 | Gale et al. |
| 2011/0260877 A1 | 10/2011 | Newman et al. |
| 2011/0313603 A1 | 12/2011 | Laberteaux et al. |
| 2012/0074903 A1 | 3/2012 | Nakashima |
| 2012/0086395 A1* | 4/2012 | Kim .................. B60L 11/1838 |
| | | 320/109 |
| 2012/0293114 A1* | 11/2012 | Murochi ............ H01M 10/06 |
| | | 320/107 |
| 2013/0116868 A1* | 5/2013 | Erko .................. B60W 10/26 |
| | | 701/22 |
| 2014/0028681 A1* | 1/2014 | Hirayama ......... G01R 31/3606 |
| | | 345/440 |
| 2014/0070013 A1* | 3/2014 | Stanek ................ B60H 1/00 |
| | | 237/28 |
| 2014/0114512 A1* | 4/2014 | Treharne ............ B60W 10/04 |
| | | 701/22 |
| 2014/0163877 A1* | 6/2014 | Kiyama ............. G01C 21/3697 |
| | | 701/533 |
| 2015/0073633 A1* | 3/2015 | Jang .................. B60W 10/26 |
| | | 701/22 |
| 2015/0097524 A1* | 4/2015 | Paik .................. B60L 11/1861 |
| | | 320/109 |
| 2015/0241233 A1* | 8/2015 | Loftus ............... G01C 21/3469 |
| | | 701/410 |
| 2015/0321572 A1 | 11/2015 | Koch et al. |

\* cited by examiner

600

| RELATIVE CAPACITY DECAY RATE | | | |
|---|---|---|---|
| TEMPERATURE \ CHARGE CONDITION | EMPTY | MID | FULL |
| T1(LOW) | 1.00 | 2.19 | 3.13 |
| T2 | 1.84 | 3.79 | 4.62 |
| T3(HIGH) | 2.98 | 5.63 | 8.00 |

BATTER CAPACITY DEGRADATION INDICATION

TECHNICAL FIELD

Various embodiments relate to a hybrid electric vehicle and a method for controlling state of charge in a battery and indicating the battery capacity.

BACKGROUND

Electric vehicles rely on the battery to provide electrical energy to propel a vehicle. The electrical energy storage capacity of these batteries can degrade over time. For example, certain operation and storage of a vehicle may impact battery life. It is desirable to avoid these certain operation and storage conditions.

SUMMARY

A vehicle, e.g., an electrical vehicle or hybrid electric vehicle, is shown and described herein. The vehicle can include a battery having battery capacity and an electrical motor to receive electricity from the battery and to provide motive force. A controller is to provide various parameters, e.g., state of charge of the battery, temperature, and vehicle off time. A display is to provide data representing at least one display image presenting information related to the parameters and battery capacity, A display generator is to generate visual data for display in said at least one display image to provide visual stimulation, representing the battery capacity, which is based on the state of charge (SOC), temperature, and vehicle off time, and user selected options to reduce possible battery capacity decay, to said user prompting said user to manage vehicle state to reduce the effect. In an example, the display is on the vehicle. In an example, the display is remote from the vehicle, e.g., a portable communication device such as a mobile phone, a tablet, a computer and the like. The display generator can be circuitry or processor(s) that are configured to output signals to the display.

In an example, the battery has a battery type and the visual data is based on usage data of the vehicle and the battery type.

In an example, the display generator generates the visual display using the vehicle off time that includes extended vehicle parking time.

In an example, the display generator is to generate a battery capacity visual data based on prior vehicle storage and charge for the same day one week prior to current day.

In an example, the display generator is to send the visual data to the display that is external to the vehicle.

In an example, the display generator is to generate a table of charge condition and temperature versus SOC.

In an example, the display generator is to generate a table of temperature versus state of charge to show a battery relative decay rate.

In an example, the display generator is to generate the table for temperatures based on at least one of the current ambient temperature range, an externally forecasted temperature, or historical temperature data sensed by the vehicle, or combinations thereof.

In an example, the display generator is to generate a color coded, graph of battery decay rate from low to high with an indicator of the current state of charge.

In an example, the graph is one of a stacked vertical graph or a stacked area graph.

The present disclosure also describes methods for providing information to the user. A method can include displaying, using a display, visual data showing the relationship of state of charge and temperature versus non-use time; and prompting, using a processor, a vehicle user to alter vehicle conditions or parameters to manage battery capacity and battery life using the visual display. In an example, displaying includes using data for the specific battery and actual usage data of the vehicle. In an example, displaying includes generating the visual display using the vehicle off time that includes extended vehicle parking time. In an example, displaying includes generating the visual display using a battery capacity decay visual data based on prior vehicle storage and charge for the same day one week prior to current day. In an example, displaying includes electronically sending the visual data to the display that is external to the vehicle. In an example, displaying includes generating a table of charge condition and temperature versus SOC. In an example, displaying includes generating a table of temperature versus state of charge to show a battery relative decay rate or a table for temperatures based on at least one of the current ambient temperature range, an externally forecasted temperature, or historical temperature data sensed by the vehicle, or combinations thereof. In an example, displaying includes generating a color coded, graph of battery decay rate from low to high with an indicator of the current state of charge. In an example, the graph is one of a stacked vertical graph or a stacked area graph.

BRIEF DESCRIPTION OF THE DRAWINGS

FIG. 6 is a table to be shown on a display or used in the systems described herein.

DETAILED DESCRIPTION

The present application describes and illustrates various representative embodiments; however, it is to be understood that the disclosed embodiments are merely exemplary and may be implemented in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for example applications. Various combinations and modifications of the features consistent with the teachings of this disclosure, however, could be desired for particular applications or implementations.

As an overview, the present disclosure describes systems and methods to teach the user to control various parameters to select the state of vehicle or battery to manage battery capacity and to reduce the likelihood of battery capacity degradation. Displaying this information to the user educates the user and providing options to the user to assist in reducing battery capacity degradation. Battery capacity degradation can occur when a vehicle is off or parked and its battery is a certain state of charge (SOC). Battery degradation can also occur during use depending on temperature and power use, which can be determined by vehicle application, driving style, and vehicle control settings. The present systems and methods provide a means for the user to assist in reducing battery degradation. In an example, the present system(s) and method(s) may demonstrate the benefits of selecting optimal parking conditions to reduce battery capacity degradation.

Figure 1:
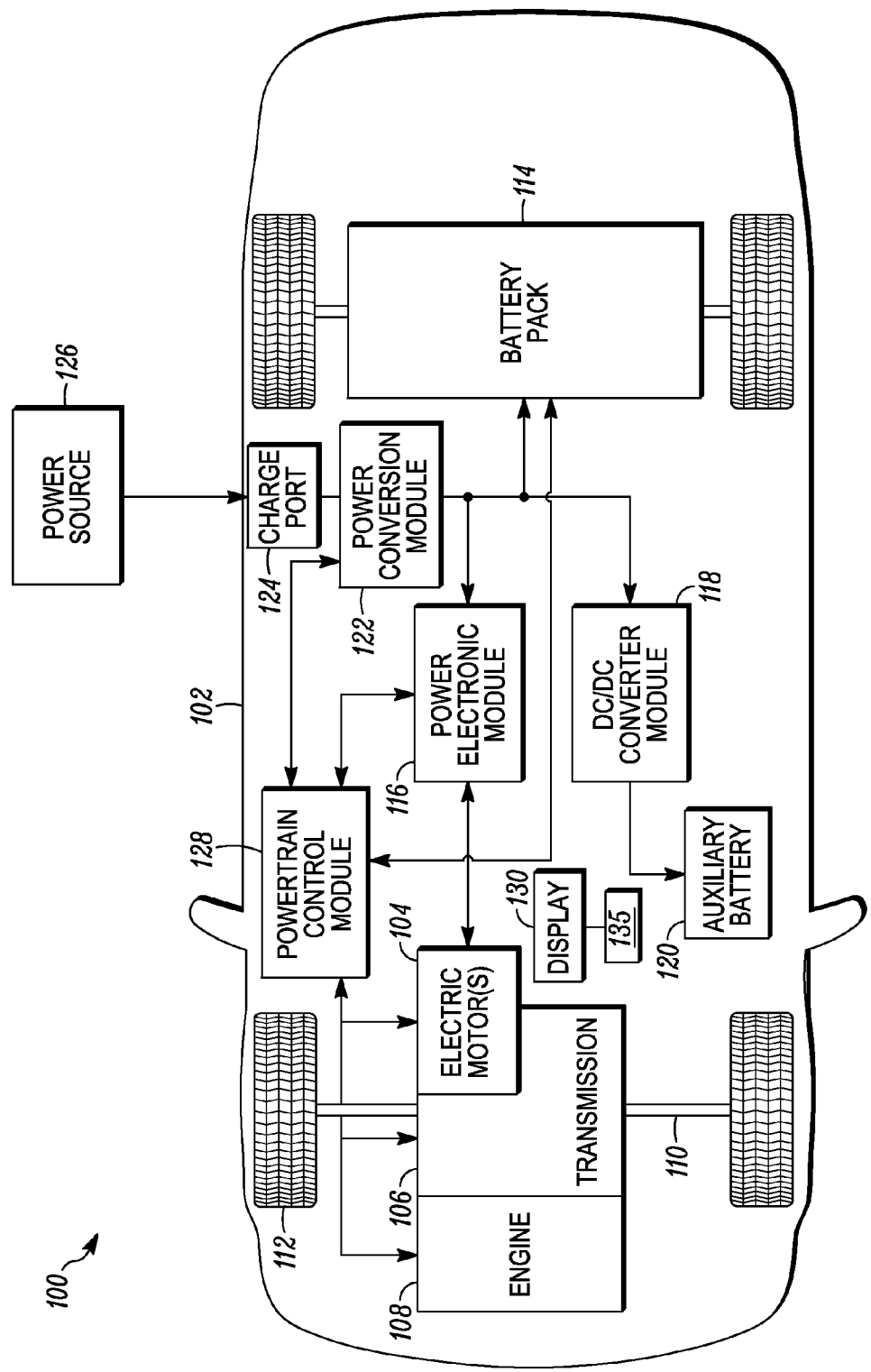
FIG. 1 is a hybrid electric vehicle that can be used with the described systems and methods.

FIG. 1 depicts an example of a representative embodiment of a hybrid-electric vehicle 102, e.g., plug-in hybrid-electric vehicle, that includes various strategies to manage battery capacity and battery life according to this disclosure. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide torque to the wheels when the engine 108 is turned on. Electric motor 104 consumes electrical energy, e.g., from a battery 114, to provide torque to propel the vehicle 102. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce vehicle emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery output is made in response to a battery power request, which can be calculated from the feedforward battery power value as a function of the driver power request and the engine power request, which in turn can be based on the speed and torque determinations. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack. The battery 114 can experience degradation during certain uses of the vehicle. One use in which degradation occurs is storage at a high state of charge (SOC). Temperature can also be a factor in degradation. Battery degradation is individualized for a specific type of battery. Battery degradation can include the inability of a battery 114 to hold a quantity of charge, e.g., less kW-hours or amp-hours are stored in the battery 114. Through education of the user or driver using methods described herein the battery capacity and battery life can be managed.

In addition to providing energy for propulsion, the battery 114 (or battery pack) may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126, which can be the electrical power grid, a generator or local electrical source. The battery charge storage status can be measured as state of charge. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

Figure 2:
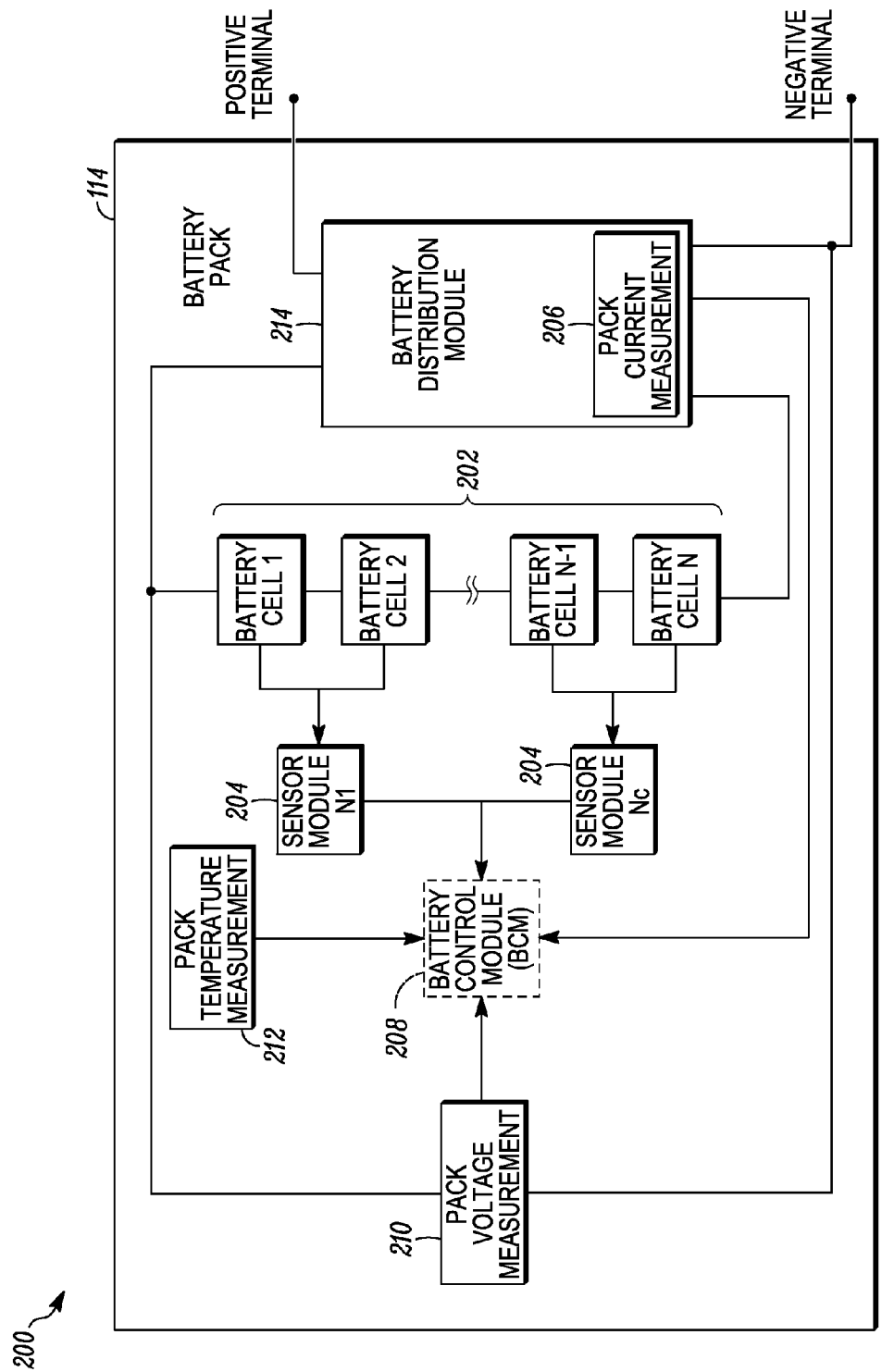
FIG. 2 is a detailed view of the battery for a hybrid electric vehicle.

In one embodiment PCM 128 cooperates with one or more controllers and/or electronics such as illustrated in FIG. 2, for example, to dynamically manage capacity of battery pack 114. PCM 128 may control charging of battery pack 114 to achieve a target battery state of charge (SOC) at a targeted time. The target or desired SOC may vary in response to at least one of ambient temperature, projected energy usage, and storage time, for example. Such a targeted SOC may be in response to the user being educated on the effects of these parameters on the battery performance. PCM 128 may be operatively coupled to a memory that stores a state of charge profile that includes the target SOC values based on at least one of the ambient or operating parameters. Similarly, PCM 128 may control charging of battery pack 114 from power source 126 and/or from engine 108 and electric motor(s) 104 to increase battery SOC to a desired or target SOC that varies in response to vehicle and/or ambient operating parameters or conditions. The user can set SOC and time of start charge to the PCM 128 through vehicle interfaces or through remote electrical communication devices.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, connectors, high voltage wires, and circuit interrupt devices.

Vehicle 100 further includes a display 130 that can show data regarding the state of the vehicle, e.g., state of the electrical system and battery 114, as well as vehicle use/non-use data. A data generator 135 can be connected to the display to compute and organize the data for the display 130. The display 130 can be an interactive display that presents a graphical user interface to allow the user to input instructions into the vehicle systems.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a disconnect device such as a fuse, switch or circuit breaker.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200. The sensors may sense parameters that relate to battery capacity and may be used in determining a current SOC and/or a desired SOC to manage battery capacity as described herein.

Figure 3:
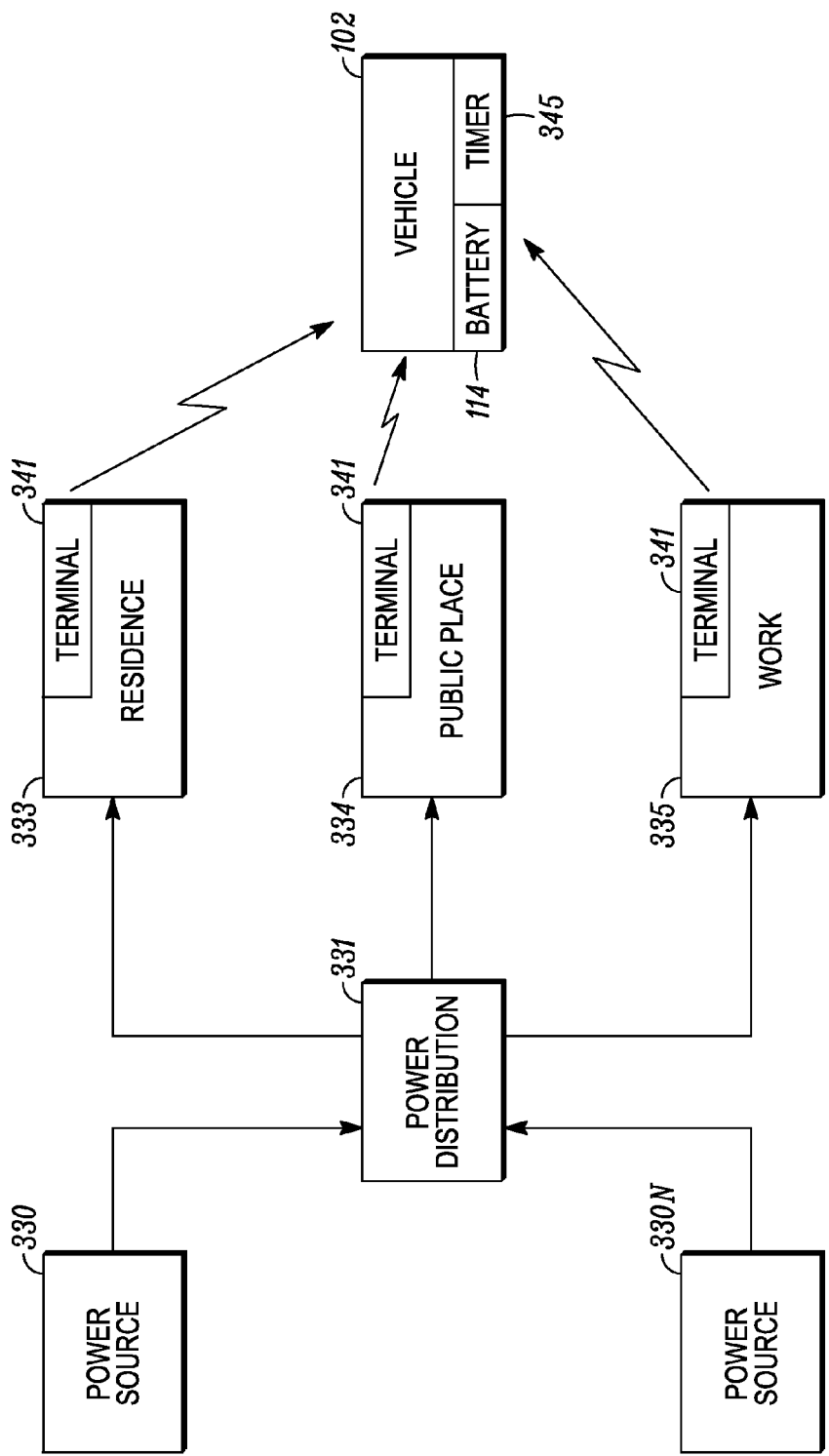
FIG. 3 is a schematic view of a system including a hybrid electric vehicle.

FIG. 3 shows vehicle battery control system 300 that can regulate the charging and discharging of a battery 114 so as to reduce degradation of the battery 114 in accordance with a user's settings. The battery system 300 includes power sources 330-330N connected to a power distribution system 331, e.g., a power grid, that supplies power to a plurality of locations, e.g., a user's residence 333, a public location 334, e.g., a retail store, park, etc., and/or a work place 335. Each of the locations 333-335 can include a charging/discharging terminal 341 that is controlled by controller circuitry. The power source(s) 330-330N may be a local power provider or a larger commercial power provider, e.g., a public utility company. The terminal 341 connects the vehicle battery 114 with at least one power source 330-330N. The terminal 341 may be positioned at in a residential house 333 and is in communication with a power outlet of the house's electrical circuitry. The power outlet may also be disposed in a workplace 335, e.g., an office building, or a public place 334, e.g., such as parking lots of shopping malls and the like. In the case of charging a vehicle, the charging terminal 341 is operable to supply either DC or AC signal to store several KWatts of power in the vehicle's battery 114. As is described herein, it may be beneficial to the vehicle battery to store the vehicle battery in a non-use state at a low SOC. The charging terminal may have a timer 345 that delays the supply of electrical signals to the vehicle such that the vehicle's SOC is at a low state for as long as possible during parking and the battery has sufficient charge for the predicted use of the vehicle. The timer 345 can receive control signals from a device of the vehicle user, who can select the storage SOC for the vehicle using the systems and methods described herein. It will be further recognized that the residence 333, public place 334 or work place 335 may include displays that can display data relating to the battery capacity degradation for a specific vehicle. It will also be recognized that the vehicle(s), the terminals 341, and the power sources 330, 330N may communicate with each other over wired or wireless communications, which communicated data may include parameters or statistics relating to parameters on the vehicle such as battery state, vehicle use, type of battery, and any of the data graphs described herein.

The system 300 can store a list of batteries 114 having information for each battery in the list, such as maximum storage capacity, the charging/discharging cycle optimal to extend the life of the battery 114 the material composition of the batteries 114, and similar information. The battery list may further include other information that affects the charging/discharging cycle of the battery 114. Examples of data for the battery can include the charging/discharging cycle configured to charge the battery 114 in the shortest time possible, how temperature affects the charging/discharging cycle of a specific battery 114, and how storage affects the battery capacity. Alternatively, the user may download the information for the vehicle battery 114 from a database through a global computer network to the vehicle 100 or terminal 341. The user may be represented with information, e.g., visual data on a display, on how to change behavior to reduce the battery capacity degradation during vehicle non-use periods.

Figure 4:
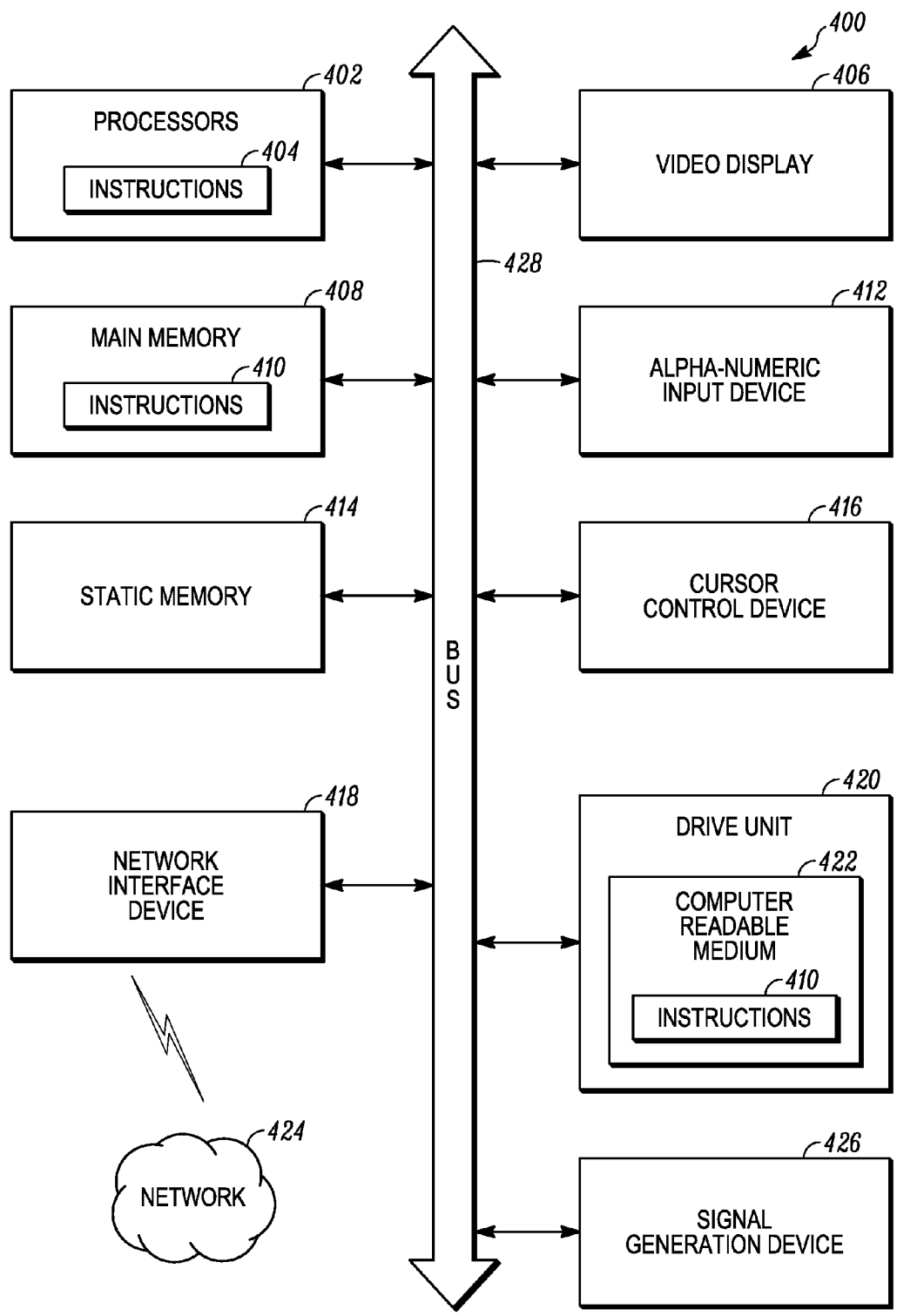
FIG. 4 is a computing system for use with a hybrid electric vehicle.

FIG. 4 shows a diagrammatic representation of machine in the example form of a computer system 400 within which a set of instructions may be executed causing the machine to perform any one or more of the methods, processes, operations, or methodologies discussed herein. The HEV 102 can operate on one or more computer systems 400. The HEV 102 can include the functionality of one or more computer systems 400 or parts of the computer system 400.

In an example embodiment, the machine operates as a standalone device or may be connected (e.g., networked) to other computing machines. In a networked deployment, the machine may operate in the capacity of a server or a client machine in server-client network environment, or as a peer machine in a peer-to-peer (or distributed) network environment. The machine may be a vehicle computing system, server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes at least one processor 402 (e.g., a central processing unit (CPU) a graphics processing unit (GPU), auxiliary processors or combinations thereof), a main memory 408 and a static memory 414, which communicate with each other via a bus 428. The computer system 400 may further include a video display 406 (e.g., a liquid crystal display (LCD), light emitting diode (LED) or a cathode ray tube (CRT)). The display 406 can be on the vehicle driver instrument panel or otherwise mounted in the vehicle. The computer system 400 also includes an alphanumeric input device 412 (e.g., a keyboard, touch screen or touchpad presenting a keyboard), a cursor control device 416 (e.g., a mouse, touch screen, joystick, track pad or the like), a drive unit 420, a signal generation device 426 (e.g., a speaker or tone generator) and a network interface device 418.

The drive unit 420 includes a machine-readable medium 422 on which is stored one or more sets of instructions 410 (e.g., software) embodying any one or more of the methodologies or functions described herein. The software 410 may also reside, completely or at least partially, within the main memory 408 and/or within the processor 402 during execution thereof by the computer system 400. The main memory 408 and the processor 402 also constituting machine-readable media.

The software, e.g., instructions 410, may further be transmitted or received over a network 424 via the network interface device 418 via communication protocols that can code and decode data for transmission. The software 410 can also be communicated over the bus 428.

Figure 5:
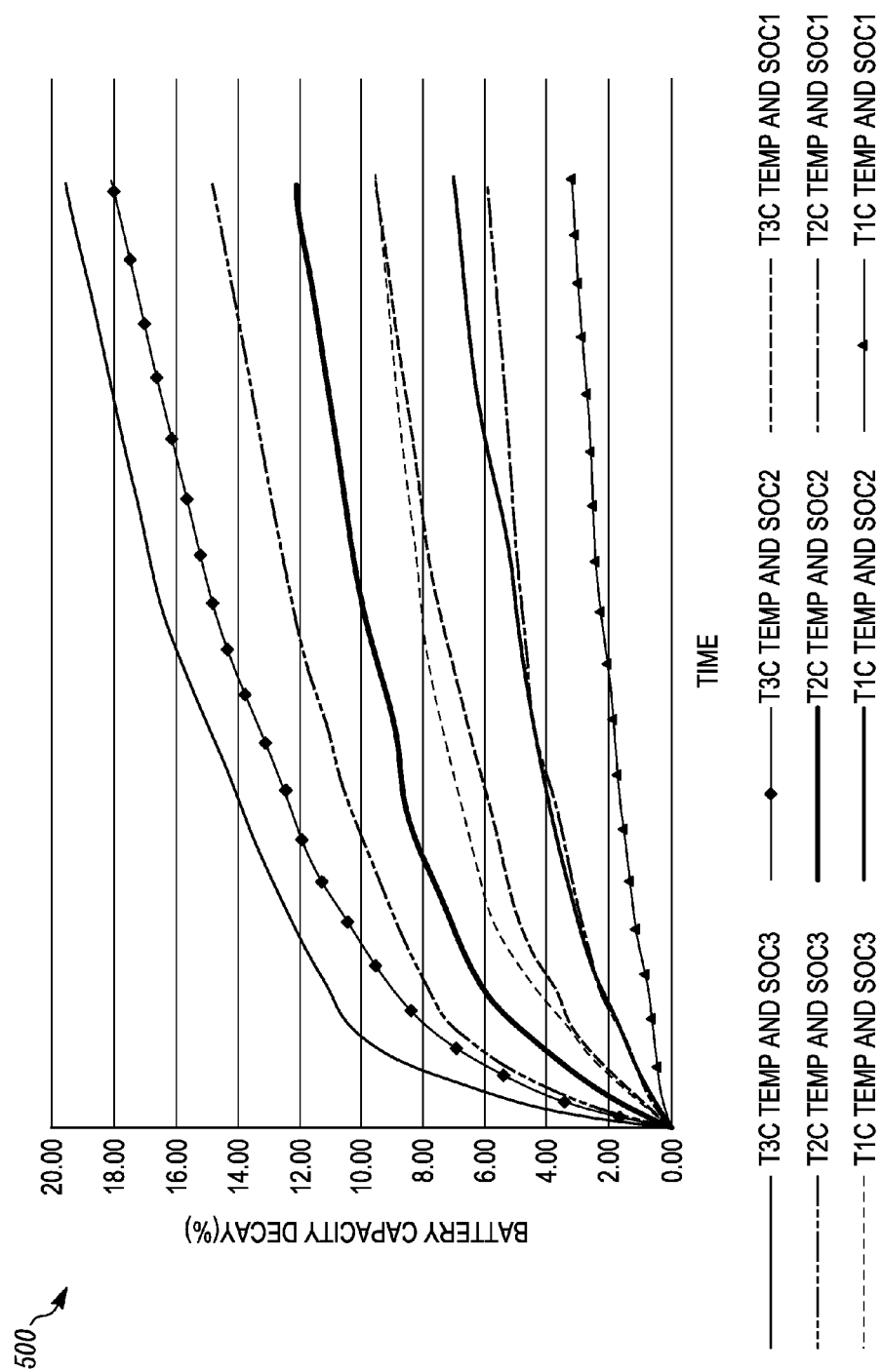
FIG. 5 is a graph to be shown on a display or used in the systems described herein.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the embodiments of the present invention. Such media can include tangible media. The term "machine-readable medium" shall accordingly be taken to include, but not be limited to, buses, tangible carrier wave signals, solid-state memories, and optical and magnetic media FIG. 5 shows a display of a graph 500 showing degradation characteristics of a vehicle battery 114. Graph 500 can be produced for viewing by a user, e.g., on a display such as display 410, a vehicle mounted display, a portable display associated with the vehicle, or a remote display. Portable displays can include electronic devices or printed material. Graph 500 shows the dependence of the battery's capacity decay on temperature and SOC. The graph 500 shows multiple temperatures and SOC curves to illustrate the battery capacity decay (Y-axis, in percent decay) as a function of time (X-axis). In the graph the temperatures are T1C, which is less than T2C, which is less than T3C. In the graph the states of charge are SOC1, which is less than SOC2, which is less than SOC3. The graph 500 shows that the highest state of charge SOC3 and the highest temperature T3C results in the highest degradation of battery capacity over time. The lowest degradation is lowest temperature and the lowest state of charge, T1C and SOC1. The graph 500 can be shown with a curve most closely related to actual time and temperature highlighted, for example, by color of by flashing. The graph 500 can also be provided to the user in the vehicle service manual. By providing this information to the user in the manner of graph 500, the user can be educated to seek shade when parking the vehicle or store the vehicle at a lower SOC, or both to manage the battery capacity and battery life.

FIG. 6 shows a display 600 of characteristics 602 of a vehicle battery 114. This display 600 shows a simplified version of the relationship of SOC and temperature on battery capacity decay rate. The battery relative decay rate can be shown on displays or in printed materials to explain battery capacity decay and the effects of temperature and SOC on the decay to educate the user and manage the battery usage. In FIG. 6, the battery capacity decay at a state of charge equaling SOC1 and temperature at T1C is defined as condition 1, shown as 1.00, i.e., a normalized battery decay rate. The relative decay at other SOC levels and temperature are ratios of battery decay over decay at SOC=SOC1 and temperature at TIC. The relative decay rate at the highest temperature T3 and SOC3 (here shown as full charge) is eight times that of the empty SOC and low temperature T1. This display 600 may provide an easier to understand view of the battery capacity decay rate (for the user) as it relates to temperature and state of charge. This simple display has nine entries that show the best condition at one and higher numbers as less desirable for the vehicle in terms of battery decay rate, which may be easier for a user to quickly comprehend than the graph of FIG. 5. In an example, the entry in the display 600 that most closely matches the real world data that is sensed by the vehicle, e.g., when the vehicle is in storage or parked, can be highlighted on the display, e.g., using different color, different font, flashing indicators or other indicia.

Figure 7:
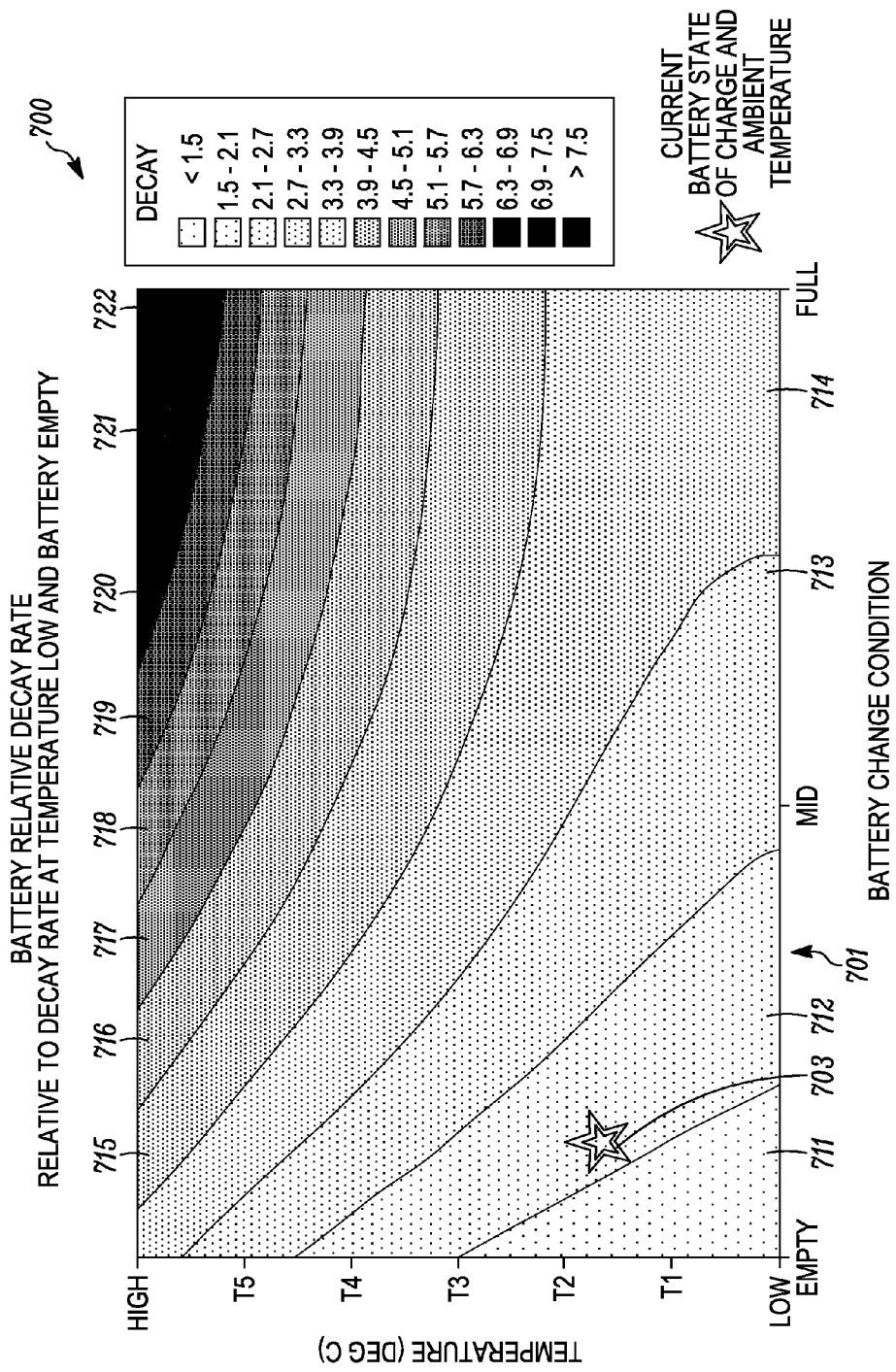
FIG. 7 is a graph to be shown on a display or used in the systems described herein.

FIG. 7 shows a display 700 of a graph 701 showing characteristics of a vehicle battery 114. This display 700 shows a more comprehensive version of the battery state, here relative decay rate, than the FIG. 6 display 600. The battery relative decay rate can be shown on a display or in printed material to explain battery capacity degradation and the effects of temperature and SOC on the degradation. An indicator (or indicia) 703 is provided to show the current relative battery capacity decay based on the current SOC and the current temperature. In FIG. 7, the battery capacity relative decay information is shown in the graph 701 with the battery charge condition, e.g., state of charge (SOC) on the X-axis and the temperature on the Y-axis. The range of the SOC is empty to full. The temperature range is broken into seven levels from low to high. The result is various regions 711-722 can be shaded or color coded so that the user can quickly discern the different regions. The user can be shown using the graph 701 that it is desirable to store or park the vehicle in the lowest battery relative capacity decay rate zone and what can be done to move to that region, e.g., find a shaded place to park or turn on the vehicle's air conditioning system to cool the battery when vehicle is plugged in.

Figure 8:
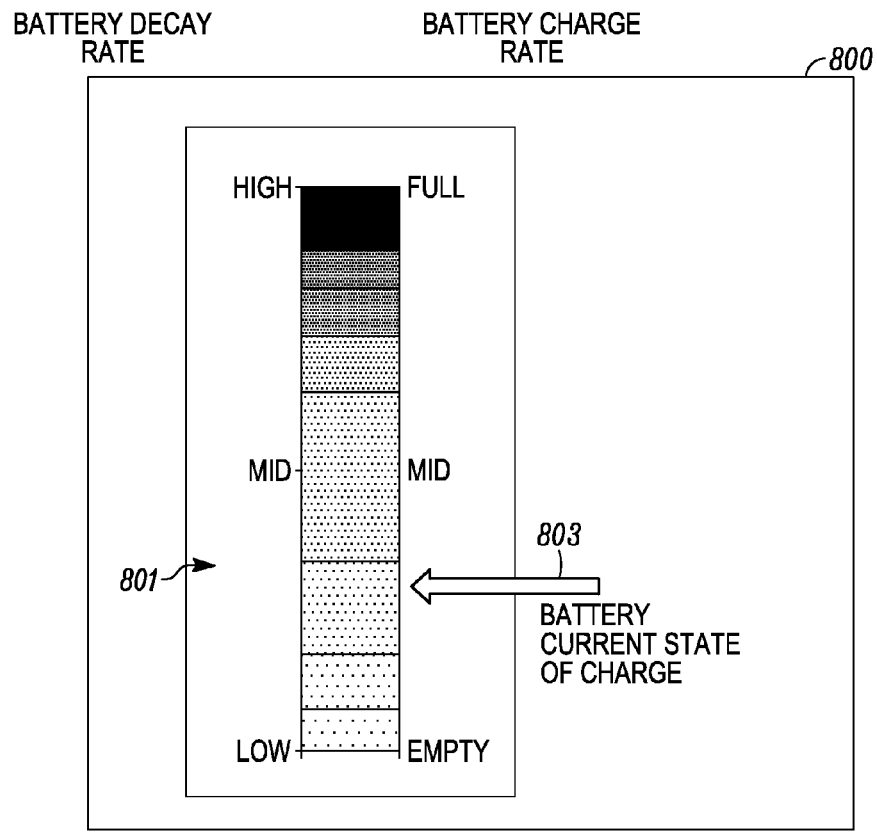
FIG. 8 is a graph to be shown on a display or used in the systems described herein.

FIG. 8 shows a display 800 of a graph 801 showing characteristics of a vehicle battery 114. This display 800 shows a simplified version of the battery relative decay rate than other displays. The battery relative decay rate can be shown on displays or in printed materials to explain battery capacity degradation and the effects of SOC on the degradation, i.e., the effects of temperature are not taken shown. Indicator (or indicia) 803 is provided to show the current relative battery capacity decay based on the current SOC.

Figure 9:
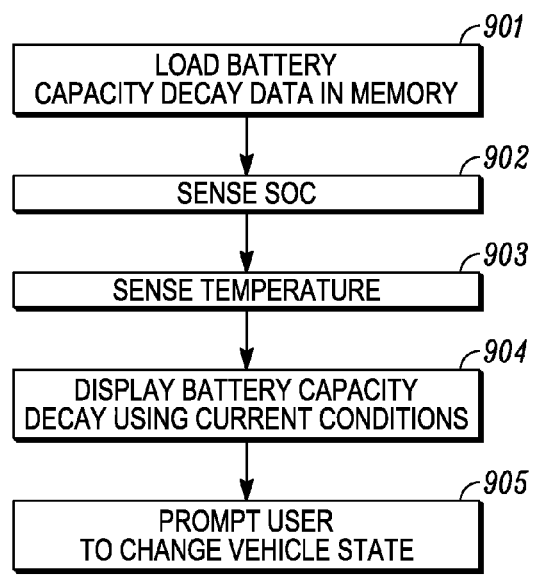
FIG. 9 is flowchart of a method according to an example.

FIG. 9 shows a flowchart according to a method 900. At 901, the decay data for the specific battery in the vehicle is loaded and stored in a memory device. The battery decay data can include battery capacity decay rates as a function of state of charge, temperature or both. This data can be in a form for showing to a user on a display or the basis for computing visual display data. At 902, the state of charge of the battery is sensed. This can be performed by the components described herein, e.g., the measurement circuitry and modules described with reference to FIGS. 1 and 2. At 903, the temperature is sensed. The temperature can be ambient temperature of the vehicle. The temperature can also be the more specific temperature within the battery structure in the vehicle. At 905, the visual data of the relationship between at least the state of charge and possibly the temperature is displayed to the user, e.g., on a mobile device, a display in the vehicle or otherwise shown to the user.

Figure 10:
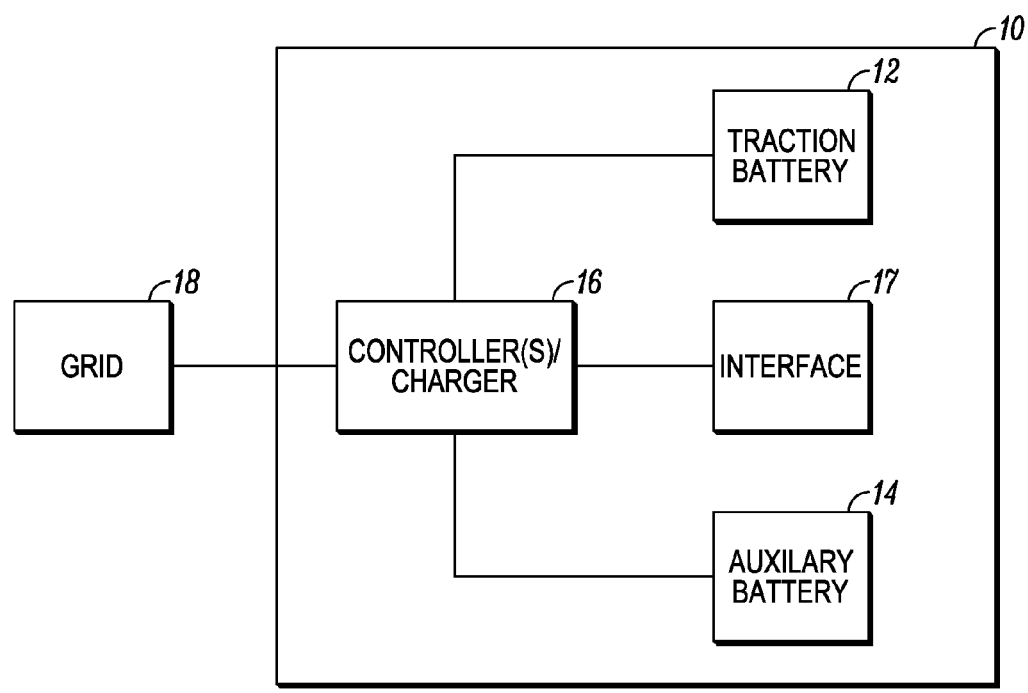
FIG. 10 shows a schematic view of an electrical power system for a vehicle.

FIG. 10 shows a schematic view of an electrical power system 10 for a vehicle. System 10 includes a vehicle that may include a traction battery 12, low voltage auxiliary battery 14, control module(s) 16, which can be the same or similar to those described with reference to FIGS. 1 and 2, battery charger 16, and driver interface 17 (e.g., display screen/panel, speaker system, etc.). The traction battery 12 may be arranged to provide energy to move the vehicle. The auxiliary battery 14 may be arranged to provide energy to auxiliary loads such as lighting, sound system, cabin climate control, etc. The vehicle, in the example of FIG. 10, is a plug-in, hybrid electric vehicle (PHEV). Other vehicle configurations such as battery, full electric, etc., however, are also contemplated. The charger 16, therefore, may be electrically connected with a power grid 18, e.g., it may be plugged-in to a wall outlet, and permit energy to flow from the grid 18 to either of the batteries 12, 14 to charge the batteries. Examples of such systems are described in U.S. patent application Ser. No. 12/721,607, which is hereby incorporated by reference for any purpose, however, if its disclose conflicts with the present written disclosure, the present disclosure controls.

Figure 11:
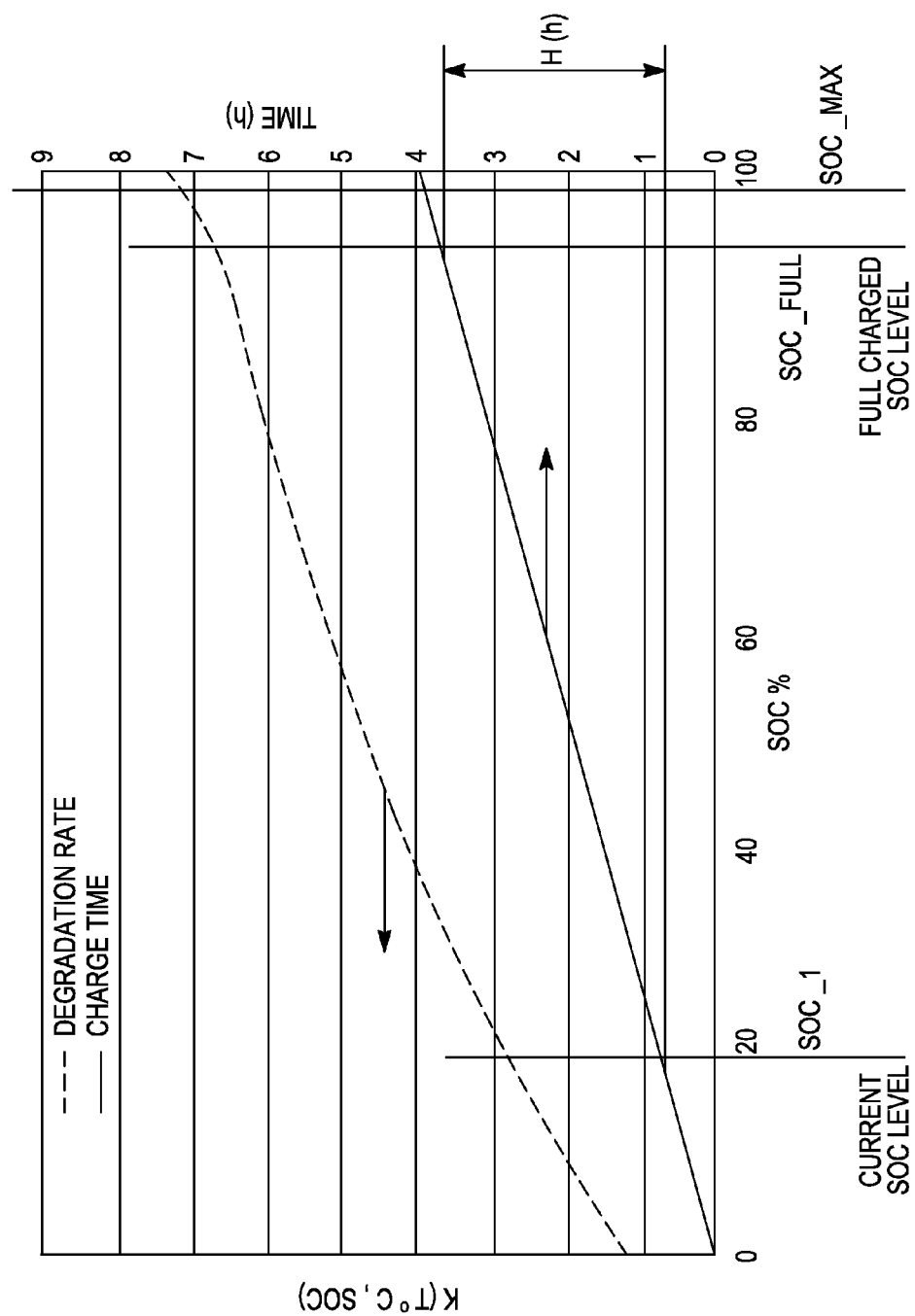
FIG. 11 shows a graph of battery capacity degradation versus the state of charge according to an example.
Figure 12:
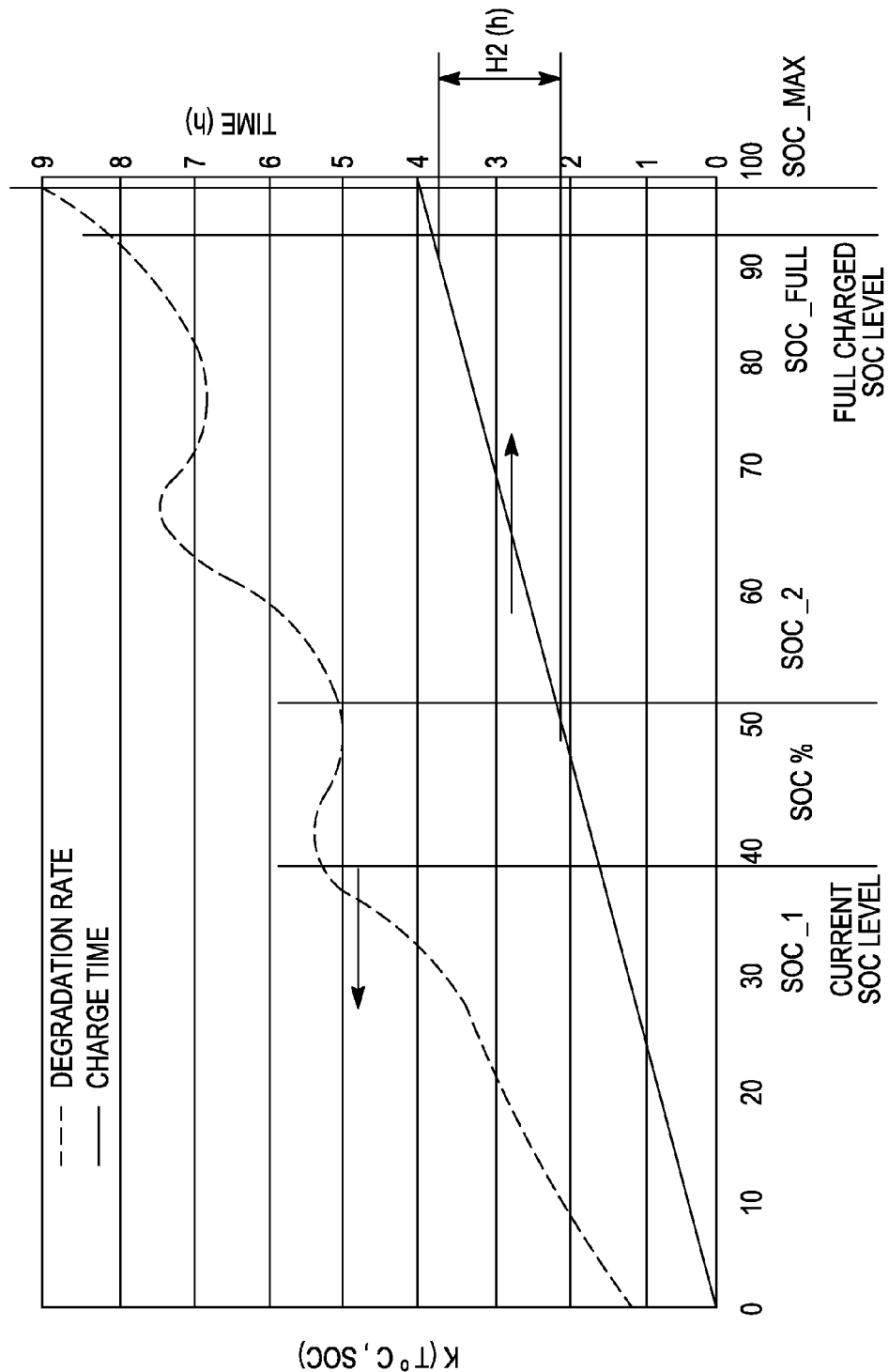
FIG. 12 shows a graph of battery capacity degradation versus the state of charge according to an example

FIGS. 11 and 12 show graphs of battery capacity degradation versus the state of charge (SOC). Battery degradation may depend on multiple parameters, e.g., chemistry of the battery, battery degradation may be described as $D=k(T, SOC)t^\alpha$, where D is battery degradation; t is time of battery calendar life; T is temperature; SOC is state of charge of battery; a is exponent parameter; and k is a function of temperature and SOC. The parameter k is a constant that is proportional to the rate of battery degradation. The degradation parameter D may be capacity degradation, charge resistance degradation, discharge resistance degradation or a combination. The exponent parameter a may depend on temperature. The relationship of k and SOC can be used to represent the battery degradation rate at different SOC levels for specified temperature range(s). For a simple case, the parameter k increases monotonically (e.g., linearly) with the increase of SOC as shown in FIG. 11. FIG. 12 shows a complex case of the degradation with are a few local maximum or minimum of k when SOC varies from 0% to 100%. For most of consumer level electric vehicles, the parking time of the vehicle is much longer than driving time. If the vehicle battery is at rest, e.g., vehicle is parked, at an SOC level with a lower degradation rate when vehicle is not used, it will decrease the battery degradation and increase battery life for same usage of vehicle. As a result, smart charging control is to set the SOC of the battery at rest at a suitable SOC level which will have lowest battery degradation rate in the SOC range. This reduced-degradation SOC range can be between battery must charge state and a fully charge SOC level, while still having an SOC to provide adequate battery power for the driver's use of the vehicle via a schedule or past use of the vehicle.

The above graphs of FIGS. 11 and 12 or the battery degradation formula can be stored or used in the systems 300, 400 or in the on-vehicle modules to control the charging of the vehicle traction battery and non-driving, battery SOC to reduce the likelihood of battery degradation and monitor battery capacity over time.

Referring back to the structure of FIG. 10, a method of controlling the SOC of a traction battery is described. The interface 17 allows the user to input the time he/she will need to use the vehicle to the controller 16. In an example, the controller 16 stores, or accesses via a communication link, the past vehicle usage and presents this information to the user via the interface 17. The user can accept the future usage as predicted by the past usage or can alter the future usage to a completely new usage or make minor alterations to the predicted usage. This can be triggered when the user connects the vehicle to a charging source, e.g., the grid 18. In an example, the user inputs the time that the vehicle will be used and an estimate of the driving distance. In an example, the user inputs the destination he/she will drive to during the next usage of the vehicle and the controller will compute the required SOC and the charge start time. If the user does not input the any information the controller 16 can start charging immediately and to a full SOC or can rely on past usage to determine a charge start time and target SOC.

The controller 16 can calculate the time of charging battery and the time of battery parking, e.g., vehicle is parked. After receiving the inputs from the user and/or memory, the controller can determine the vehicle park time. Vehicle park time can be the time from a current time to a time at which the user using the vehicle. The controller 16 can also determine the charging time, which is time need to charge the battery from current SOC to a desired SOC level based on the battery calibration information that is already stored in memory associated with the controller. The controller 16 can further determine the battery rest time which is parking time minus charging time. If the charging time is greater or equal the parking time, the controller starts charging immediately.

The controller 16 can further access the battery degradation information, which can be stored in memory or derived from data stored in memory, and determine a favorable SOC whereat the battery should be stored during a rest time. The relationship of a battery degradation rate with SOC such as k(T, SOS) versus SOC can be stored in a memory as a table of data or as an instruction in the form of a function. The controller can search from current SOC level to a fully charged SOC level to find the SOC level that has the minimum battery degradation rate.

The controller can further determine the time and point of starting/stopping charge battery and charging. Using the information about calculated time and SOC level with the minimum degradation rate, the controller can determine when to begin charging the battery and when to not charge the battery and allow the batter to be in a rest time period. The controller can vary the charging and rest scheme based on a particular battery's degradation properties. For example, in the case where the battery degradation rate increases monotonically with the increase of SOC as shown in FIG. 11, the user parks the vehicle, and connects the charging cable with vehicle's power electrical system, the controller can check the battery SOC level (e.g., SOC_1) and determine the batter charging time from SOC_1 to SOC_full to be H hours. The controller can further determine the best degradation point at which the battery can be stored in the range of from SOC_1 to SOC_full is at the current SOC level (SOC_1). The controller will not issue command of start charging and let battery rest at the current SOC_1 level until the rest time passed and the charge time must begin to provide adequate charge to the battery. At the time, e.g., H hours before customer schedule driving time, the controller can command to start charging battery so that the battery will be charged to an extent to meet the user's needs for vehicle usage at the scheduled driving time of the user.

In the case in which there are a few local maximum or minimum of degradation rate(s) as shown in FIG. 12. For Example, when user is parking the vehicle and connects the charging cable with vehicle, the controller not only checks the battery SOC level (SOC_1), but also determines that the SOC level with least degradation rate between current SOC_1 and SOC_full is at SOC_2. Because the least degradation level is not at the current SOC of the battery, the controller issues a command to charge the battery. The battery will be charged until its SOC level reaches SOC_2. After the battery SOC level reached SOC_2, the controller will command to stop charging battery and hold battery at SOC_2 level to reduce battery degradation. The controller can calculate the required time for charging the battery from SOC_2 to SOC_full, which is at time H2. At the time H2 hours before customer schedule driving time, the controller will issue another command to start charging battery; the battery will be fully charged be charged to an extent to meet the user's needs for vehicle usage at the scheduled driving time of the user.

Beyond the stated control strategy of the controller to set the SOC level during battery rest (parking or non-driving time), the controller can perform additional battery charge control. For example, for the vehicle used to commute between the working office and home, the driving distance from home to office, daytime parking, and driving distance from office to home is approximately known. In this case, the controller can further schedule the battery charging process, such as suitably adjust the SOC level defined as battery being fully charged, to let the battery rest at an SOC level that has relatively lower degradation rate even during the daytime parking period, or properly extend the vehicle driving range per user need. In order to do more advanced control, the controller will ask a user to input more information, e.g., the longest daytime parking length, the driving distance before the vehicle is parked at work during a work shift or at home for the night, and total driving distance before the next charging session when customer connect the vehicle battery to a battery charger or the grid. According to the total driving distance, the controller can implements different battery charge control strategies.

If the total driving distance is short and less than vehicle range, the controller can perform the basic charging control scheme as described herein.

If the total driving distance is a 5-15% more than vehicle range, but less than the maximum range. Instead using of SOC_full as the level of the charging time and as the point of stop charge the battery, the controller can use the SOC_max (see FIG. 11 and FIG. 12) as the reference level of battery is fully charged. The controller can calculate a charging time using SOC_max, and can perform the steps as described in basic control. Typical traction battery controls do not charge to the SOC_max but only to the SOC_full. This scheme will allow the battery to charge to bypass SOC_full to SOC_max.

Figure 13:
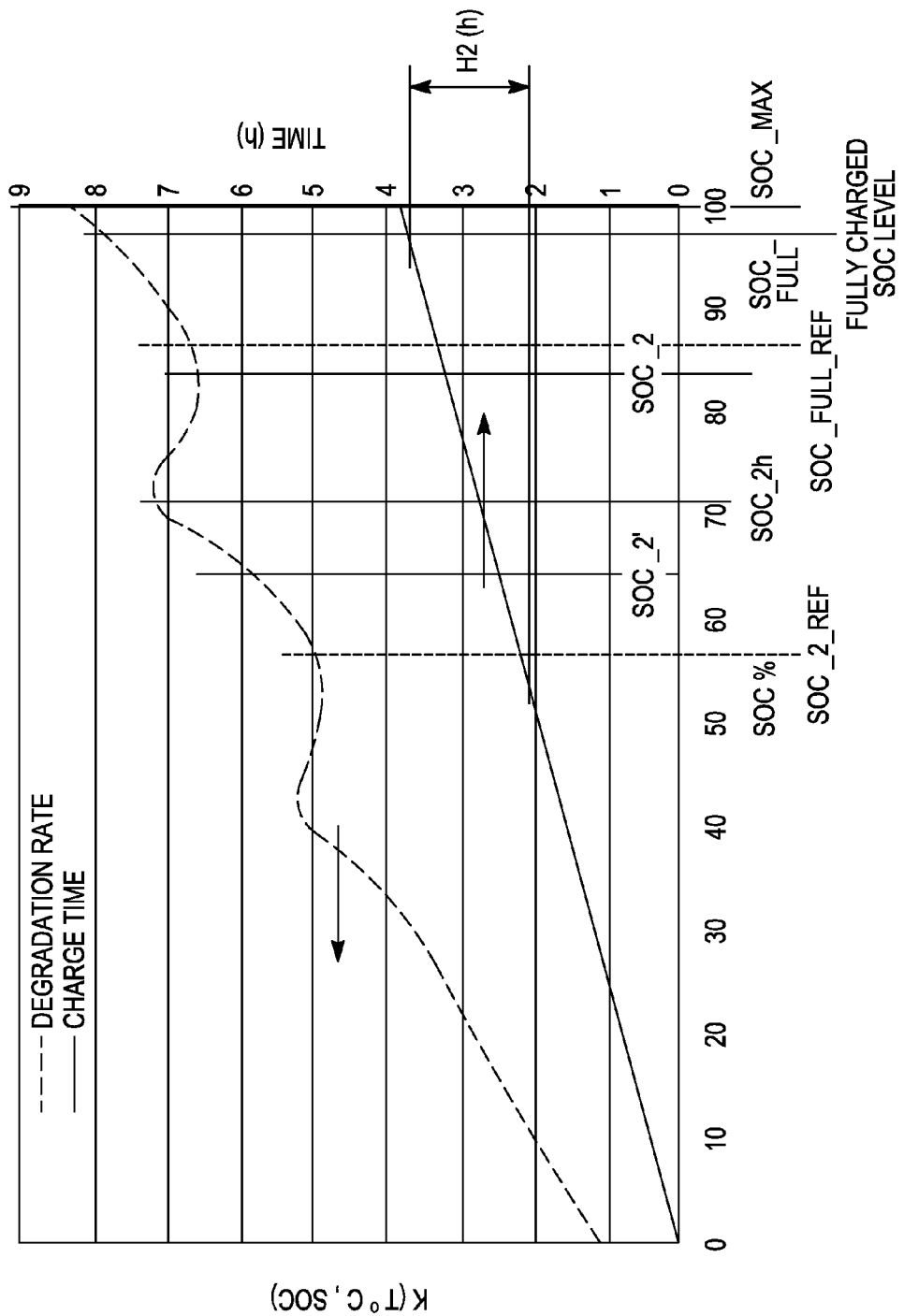
FIG. 13 shows a graph of battery capacity degradation versus the state of charge according to an example.

If the total driving distance is significantly less than vehicle range (70% or less), and battery has a few local maximum or minimum of degradation rate vs. SOC level as shown in FIG. 13, the controller can perform advanced control schemes using the stored data with the local minimum(s) and maximum(s).

Based on user input of drive distance before the longest daytime parking (e.g., work parking), the controller can estimate the SOC level of battery during the longest daytime parking. If the SOC level is not on or near the local maximum of degradation rate, such as in SOC_2 or SOC_2' as shown in FIG. 13, the controller will charge the battery using the basic control scheme.

Based on user input of drive distance before the longest daytime parking (e.g., work parking), estimate the SOC level of battery during the longest daytime parking. If the SOC level is on or near the level with local maximum of battery degradation rate, such as in SOC_2h shown in FIG. 13, the controller will determine the SOC level which has the local minimum of degradation rate in the SOC range that is lower than SOC_2h, or the SOC level where the battery degradation rate is not higher than at any SOC level which is higher than SOC_2h. For example, the point SOC_2_ref shown in FIG. 13. After the SOC_2_ref is determined, the controller will estimate SOC level that when battery SOC dropped from this level to SOC_2_ref, the vehicle driving distance equals that customer scheduled distance before longest daytime parking. This SOC level is shown as SOC_full_ref in FIG. 13. The controller can also estimate if the vehicle can drive the total distance that customer scheduled when battery SOC dropped from SOC_full_ref to SOC_low. If answer is yes, the controller will charge the battery to SOC_full_ref instead using of SOC_full via the control strategy specified in basic control. In the control process, the charge time will be calculated based on SOC_full_ref. If answer is no, the controller will only do the basic control scheme and charge battery to SOC_full.

All batteries used as motive power sources in a battery electric vehicle (BEV) or a plug-in hybrid vehicle (PHEV) suffer performance degradation that is dependent on the chemical composition of the battery's constituents, usage conditions, and rest conditions. For a battery electric vehicle (BEV) and plug-in hybrid vehicle (PHEV), the battery's columbic capacity controls all-electric driving range and fuel economy for a PHEV. A battery cannot be made that is free from capacity degradation over the life of the battery. Nonetheless, the battery life can be maintained if the conditions of usage and rest are improved. If the user is educated on the operation of the vehicle with battery life and capacity in mind then battery life may be longer, customers may be experience greater satisfaction, and lower battery warranty costs.

Battery management can be characterized via testing and includes both charge/discharge cycling and storage. The cycling degradation is dependent on vehicle usage, and the storage degradation is dependent on battery state-of-charge (SOC), temperature during parking, and length of time. Most users' vehicles are parked over 90% of the time, as opposed to being driven. Most of the time that the vehicle is parked is overnight, which is when the vehicle's battery is scheduled to be charged. Depending on the chemical composition of the battery's constituents, the battery's storage degradation rate is dependent on SOC. If a customer is able to maximize the time during an overnight parking period (i.e., without charge) that the battery stays at the lowest SOC level (with the lowest capacity degradation rate), it is possible to reduce the battery's degradation by up to 30% relative to a battery staying at a high SOC level during the overnight parking period over time, keeping the same usage and charging conditions. In addition to being able to select a parking SOC level, if the customer is also able to reduce the vehicle temperature, it is possible to reduce the battery degradation up to 50%.

Vehicle user satisfaction can be increased through proper educational efforts that make the customers aware of battery management behavior and providing information to guide them in reducing the vehicle usage to manage their vehicle's battery life and capacity. The presently described method(s) and systems(s) can educate the user on the effects of the SOC and temperature on battery capacity and guide them to treat the battery in a favorable fashion that manages the degradation of the battery's capacity. That is, the user is educated to alter their behavior to move to the lowest level of graph 801, toward the origin of the graph 701, toward the upper left of graph 601 or to the lowest curve shown in graph 501. Such education and display of data may serve to preserve the battery capacity and, hence, the BEV and PHEV customer's all-electric driving range and PHEV customer's fuel economy.

Examples of how the present system(s) and method(s) may be used to assist various users are given below. It will be assumed that each of the four users drive and charge their HEV in a same way. For example, every day their vehicles are driven for two hours. The vehicle is parked during the daytime between driving times, for a total of eight hours. The users arrive home with the battery nearly fully discharged, at a low SOC level. The vehicle is then continuously parked (during the nighttime) for 14 hours, during which time there is both a charge time and a non-charge (i.e., rest) time. The battery charge time during this nighttime parking period is four hours. Each of the four users has different habits within the above scenario.

A first user immediately plugs in the vehicle and charges the battery immediately upon arrival at home. After four hours, the battery is fully charged at a high SOC level. Thereafter, the battery sits at the high SOC level for ten hours during the nighttime parking period until he/she uses the vehicle the next day. During daytime the next day, the vehicle is exposed to a full sun load during the daytime parking period with the average vehicle cabin temperature at a high level. It can be assumed that 70% of this customer's total degradation is due to parking and that 30% is due to charging and driving. This user could benefit from the education provided by the present system(s) and method(s) to reduce the battery degradation.

A second user delays charging the vehicle until four hours before he/she does the daytime drive the next day. The battery sat at the relatively low SOC for 10 hours during the nighttime parking period before the battery was charged. During the day, this customer treats the vehicle the same way as the first customer, in terms of driving and parking. Because this user delayed the nighttime charge, the battery degradation occurring during the nighttime parking period is only 54% of that of the first user, and the total battery degradation is 67.5% of the total degradation of the first user.

A third user charges the battery immediately upon arrival at home (i.e., like the first user), but during the daytime parking, the vehicle is not exposed to a full sun load and the vehicle cabin temperature is relatively low, e.g., at least 20 degrees C. cooler than the first user's vehicle. The third user's degradation during driving is same as the first and second users, but the battery degradation occurring during the daytime parking period is only 80% of that of the first and second users, and the total degradation is 86% of the total battery degradation of the first user.

The fourth customer is mindful of the effects of SOC on battery life. This user may have been educated using the presently described system(s) and method(s). The fourth user elects to delay charging the vehicle until four hours before the fourth user does the daytime drive the next day (i.e., like the second user). During the day time parking period, because the fourth user is mindful of the effects of temperature on battery life and battery degradation, the fourth user chooses parking conditions that allow the vehicle to not be exposed to a full sun load, and the vehicle cabin temperature is relatively low (i.e., like the third user). The fourth user's degradation during driving is same as the other users (they all drive the same amount, here two hours), but the battery degradation generated during the daytime and nighttime parking periods is only 34% of the first user, and the total degradation of the battery is only 54% of total battery degradation of the first user.

These examples of users illustrate that an educated customer (i.e., the fourth user) can significantly extend their battery life over a user that is unaware of the effects of temperature and SOC on the battery life (i.e., the first user).

As described herein the battery used in a vehicle degrades when the vehicle is parked and when it is being driven. During driving the degradation of the battery is dependent on temperature and input (or output) power, which is determined by vehicle application and vehicle control settings. During parking the degradation is dependent on SOC, temperature, and time duration. The degradation during parking increases with increasing temperature. The SOC effects on degradation are dependent on the chemical composition of the batteries constituents. In an example, the degradation rate increases monotonically with SOC and can change significantly with changing SOC levels. If the battery is able to rest at an SOC level with a lower degradation rate when vehicle is not in use, this will decrease battery degradation and increase battery life. The user can be educated regarding the degradation causes. The user can manually control when they charge the vehicle based on to their individual vehicle's usage conditions. This control may be accomplished with control devices, such as timers and current flow devices.

It should be noted that battery capacity degradation is a natural phenomenon of batteries as all batteries lose their ability to store electrical charge over time do to the very structures of batteries. The present disclosure describes structures and methods that attempt to reduce the natural phenomenon of batteries.

Other examples of vehicle battery degradation reduction methods and systems are described in U.S. patent application Ser. No. 14/278,011, titled ELECTRIC VEHICLE BATTERY CAPACITY LOSS ALLEVIATION, attorney reference FMC 4732 PUS, which is hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a battery having a battery electrical storage capacity and a state of charge;
   an electrical motor, connected to the battery, to provide motive force;
   a controller to provide battery state of charge, ambient temperature, and vehicle-off time;
   a display to provide data representing a display image presenting information related to a battery-capacity-degradation state;
   a display generator to generate visual data for display in the display image to provide visual stimulation, representing the battery-capacity-degradation state, which is based on the state of charge (SOC), ambient temperature, and vehicle-off time, and user selected options to reduce battery capacity degradation, to the user;
   wherein the battery has a battery type and the visual data is based on usage data of the vehicle and the battery type; and
   wherein the display generator generates a visual display from the visual data using the vehicle off time that includes extended vehicle parking time and the controller sets a charging time of the battery based on the extended vehicle parking time, a current SOC, a battery degradation indication as a function of the current SOC and temperature, and a desired SOC for the next vehicle usage.

2. The vehicle according to claim 1, wherein the display generator is to generate a battery capacity decay visual data based on prior vehicle storage and charge for a same day one week prior to current day.

3. The vehicle according to claim 1, wherein the display generator is to send the visual data to the display that is external to the vehicle.

4. The vehicle according to claim 1, wherein the display generator is to generate a table of charge condition and temperature versus SOC.

5. The vehicle according to claim 1, wherein the display generator is to generate a table of temperature versus state of charge to show a battery relative capacitive decay rate.

6. The vehicle according to claim 5, wherein the display generator is to generate the table for temperatures based on at least one of a current ambient temperature range, an externally forecasted temperature, or historical temperature data sensed by the vehicle, or combinations thereof.

7. The vehicle according to claim 1, wherein the display generator is to generate a color coded, graph of battery decay rate from low to high with an indicator of a current state of charge.

8. The vehicle according to claim 7, wherein the graph is one of a stacked vertical graph or a stacked area graph.

9. A method comprising:
   displaying, using a display, visual data showing a relationship of state of charge, ambient temperature versus non-use time, extended parking time, historic same-day vehicle usage, and a battery type; and
   prompting, using a processor, a vehicle user to alter vehicle conditions to manage both battery capacity and battery life using displayed visual data to reduce battery capacity degradation.

10. The method of claim 9, wherein displaying includes using data for the battery type and actual usage data of the vehicle to reduce battery capacity degradation.

11. The method of claim 9, wherein displaying includes generating the visual display using battery capacity visual data based on prior vehicle storage and charge for a same day one week prior to current day.

12. The method of claim 9, wherein displaying includes electronically sending the visual data to the display that is external to the vehicle.

13. The method of claim 9, wherein displaying includes generating a table of charge condition and temperature versus SOC.

14. The method of claim 9, wherein displaying includes generating a table of temperature versus state of charge to show a battery relative decay rate based on at least one of a current ambient temperature range, an externally forecasted temperature, or historical temperature data sensed by the vehicle, or combinations thereof.

15. The method of claim 9, wherein displaying includes generating a color coded, graph of battery decay rate from low to high with an indicator of a current state of charge.

16. The method according to claim 15, wherein the graph is one of a stacked vertical graph or a stacked area graph.

17. A vehicle comprising:
   a battery having a battery type and a battery capacity;
   an electrical motor to receive electricity from the battery and to provide motive force;
   a controller to provide state of charge of the battery, temperature, and vehicle off time;
   a display to provide data representing at least one display image presenting information related to a state that contributes to degrading battery capacity;
   a display generator to generate visual data for display in the at least one display image to provide a visual, representing the state, which is based on the state of charge (SOC), temperature, and vehicle off time, and user selected options to reduce battery capacity decay, to the user, wherein the visual data is at least in part based on usage data of the vehicle and the battery type; and
   wherein the display generator is to generate a visual display based on using the vehicle off time that includes extended vehicle parking time, a battery capacity decay visual data based on prior vehicle storage and charge for a same day one week prior to current day, or a combination thereof.

18. Vehicle comprising: a battery having battery capacity; an electrical motor powered by the battery to provide motive force; a controller to provide battery state-ofcharge, temperature, and non-use time; means for displaying visual data showing a relationship of state-of-charge and ambient temperature versus non-use time, extended parking time, historic same-day vehicle usage and battery type from the controller; and means for prompting a vehicle user to alter vehicle conditions to manage both battery capacity and battery life using displayed visual data to reduce battery capacity degradation.

\* \* \* \* \*